United States Patent [19]

Hencke

[11] 4,193,779

[45] Mar. 18, 1980

[54] AIR FILTERING APPARATUS

[75] Inventor: Dietmar Hencke, Möglingen, Fed. Rep. of Germany

[73] Assignee: LTG Lufttechnische GmbH, Stuttgart, Fed. Rep. of Germany

[21] Appl. No.: 932,975

[22] Filed: Aug. 11, 1978

[30] Foreign Application Priority Data

Jan. 20, 1978 [DE] Fed. Rep. of Germany ....... 2802369

[51] Int. Cl.² .......................................... B01D 46/38
[52] U.S. Cl. ..................................... 55/290; 55/294; 55/408; 55/DIG. 13
[58] Field of Search ................ 55/317, 290, 294, 391, 55/408, 409, 400, 405, DIG. 13

[56] References Cited

U.S. PATENT DOCUMENTS

| | | | |
|---|---|---|---|
| 2,994,407 | 8/1961 | Van Diepenbroek | 55/400 |
| 3,308,610 | 3/1967 | Springer et al. | 55/DIG. 13 |
| 3,345,805 | 10/1967 | Sherrill | 55/290 |
| 3,443,696 | 5/1969 | Schutte | 55/408 |
| 3,864,107 | 2/1975 | Baigas, Jr. | 55/294 |

*Primary Examiner*—Norman Yudkoff
*Attorney, Agent, or Firm*—Edwin E. Greigg

[57] ABSTRACT

An apparatus which serves to clean air containing fine dust and also larger particles, such as fibrous material, thread ends, etc., which are produced in an industrial environment, especially a textile plant. In order to conduct a two-stage cleaning process without the necessity of dimensioning two filtering stages for the full air flow, there is provided a vortex chamber into which the unclean air is admitted tangentially or in some manner which produces a rotary flow with centrifugal force components which act on the larger particles in the air stream. The vortex chamber includes a rotating filter drum, the interior of which may preferably be provided with suction, causing air to flow from the vortex chamber through the filter, depositing thereon the fine dust carried by the incoming air. The clean air is conducted out of the apparatus through a clean air outlet while the larger contaminants are conducted out of the vortex chamber through a separate outlet by a relatively small fraction of the total air flow.

16 Claims, 3 Drawing Figures

AIR FILTERING APPARATUS

BACKGROUND OF THE INVENTION

The invention relates broadly to apparatus for filtering air. More particularly, the invention relates to an apparatus for removing dust and fibrous material from the ambient air in a surrounding enclosure or space, especially that of the machine rooms of textile manufacturing factories. The invention especially relates to improvements in filtering apparatus in which a rotating filter drum receives air from the outside and discharges it from the interior of the drum while a suction mechanism removes the trapped or filtered-out material from the circumference of the filtering drum. Depending on the permeability of the filtering medium, which is disposed on the circumference of the filtering drum, the filter either traps only fibers or larger contaminants, such as fiber fragments, coarse dust, and the like, and will consequently permit fine dust to pass through unimpeded. In that case, the fine particles will be carried along with the air after passage through the filtering apparatus and will thus require a second filtering in a subsequent fine filter. Inasmuch as the entire air flow must pass through the filter, this second filter must also have a throughput rate equal to the total air flow, which makes it expensive. Two-stage filtering systems of this type are expensive and require a substantial space for installation. If the first drum filter is dispensed with, i.e., if only a fine dust filter is provided, the coarser contaminants, i.e., fiber remnants and coarse dust, are not separated from the more finely distributed dust which makes it difficult or even impossible to recover the fibrous remnants for other purposes. It is also known in the art to provide as a first filtering system a so-called cyclone separator, for example as described in the German Offenlegungsschrift No. 1 908 442. Such a separator, however, still requires a second filtering stage to remove the fine dust which thus is still required to have dimensions capable of handling the entire air flow rate that passes through the first filtering stage.

OBJECT AND SUMMARY OF THE INVENTION

It is thus a principal object of the present invention to provide a filtering system which has only a single filtering stage yet in which there occurs a separation of fine dust from coarse contaminants such as fibers, fiber fragments and large dust grains. It is a secondary object of the invention to provide a filtering system which is reduced in cost of construction and operation and thus is usable for applications which could not economically support the known two stage filtering systems.

These and other objects are attained by providing a single rotating filtering drum in a vortex chamber having at least one inlet for the contaminated air which rotates in the vortex chamber around the circumference of the filtering drum and by further providing a first outlet for removing from the vortex chamber a small portion of the incoming air together with some of the coarser contaminants while the majority of the air passes through a second air outlet from the interior of the filtering drum.

The apparatus according to the present invention is a single stage apparatus and yet permits the separation of fibers and coarse contaminants from the much finer dust which is also carrried by the incoming air. The main air current which passes through the second outlet of the apparatus normally would carry, for example, between 85 and 95% of the air entering the vortex chamber and constitutes clean air which can be used for any purpose whatever, for example as the inlet of an air conditioning system within the machine room or the building or an air conditioning system associated with one or more textile machines, while the exhaust air from these machines is used as input air to the filtering system. It is thus possible to save the cost of heating, cooling or humidifying the input air to an air conditioning system of this type. Even if the closed air is partly or completely exhausted into the atmosphere, the apparatus of the invention still provides an advantage because the removal of fine dust from that air reduces the contamination of the environment.

The filtering system according to the present invention is usually still economical when the known two-stage filtering system can no longer be justified on economical grounds.

If the apparatus according to the invention is constructed for very large air throughput quantities, for which previously two-stage systems had been used, it is still to be preferred over the known systems because of its reduced cost of construction, the reduced space requirements and the reduced operational costs.

The filtering system according to the present invention operates in the following manner:

The contaminated air entering the vortex chamber of the apparatus rotates around the circumference of the filtering drum so that particles and contaminants carried in the air stream travel in substantially helical paths around the filtering drum. The filtering material attached to the circumference of the filtering drum prevents the passage of all contaminants including the fine dust through the filtering medium into the interior volume of the filtering drum so that the air which enters the inside of the filtering drum is cleaned air which may be used without further processing as inlet air for an air conditioning system or as resupplied ambient air. The filtering system is so constructed that the large majority of the air flowing into the vortex chamber actually flows through the filter covering of the drum to the second air outlet and is clean air which may be carried further for any suitable purpose and constitutes, for example, on the average 90% of the air entering the vortex chamber. All of the fine dust particles present in the incoming air will tend to settle on the filter material on the drum and tend to adhere to it until they are aspirated by the suction nozzle. Normally, the suction nozzle may be moved up and down along the filtering drum either continuously or intermittently so as to clean the drum externally by strips.

The settling of larger fibers and gross comtaminants on the circumference of the filter is prevented, however, by the fact that the air in the vortex chamber rotates and tends to remove them from the surface of the filtering drum as soon as they come near it so that they are finally carried to the vicinity of the first air outlet where they are removed by an air stream which constitutes only a very small portion of the total air stream. The partial air flow into this first air outlet may normally be on the order of 5 to 15%, preferably approximately 10% of the entire air flow entering the vortex chamber.

If, in operation, some of the larger contaminants and fibers actually do settle on the circumference of the filter, they will eventually be aspirated together with the fine dust by the traveling suction nozzle. Thus at least the large majority of the larger contaminants and fibers will pass out of the system into the first air outlet and is carried along the partial air flow therethrough which, however, represents only a small percentage of the overall air flow so that these fibers may be separated and removed by a fiber separator which is dimensioned for a relatively small air flow rate.

The same considerations apply to the removal of the dust from the air stream passing through the suction nozzle, which also is only a very small fraction of the total air flow.

In a preferred embodiment of the present invention, the filter covering of the rotating drum consists of two superimposed filtering media, i.e., a fine dust filter and, externally thereof, a surrounding coarse filter which may be used to trap, for example, textile fibers and some of the larger contaminants including coarse grains of dust and the like. These coarser contaminants thus never reach the fine dust filter. As a result, the circumference of the filter remains free from most of the larger contaminants and fibers because the rotating air stream has a tendency to remove them much more easily from the coarse filter than it could have from the surface of the fine filter where the dust which has settled tends to protect the fibers from being affected by the air stream. The coarse filter may preferably be a grid, made of metal or plastic.

The fine dust filter may preferably be a porous foam but may also be a plush-like web or knitting or the like.

The rotary air flow in the vortex chamber may have the effect of causing the larger contaminants including fibers to acquire a radial velocity due to the centrifugal force acting on them, thereby increasing their radial distance from the surface of the filtering drum and reaching the first air outlet which is located at the surrounding wall of the vortex chamber. The larger contaminants take this path because the ratio of the centrifugal force to the resistance to the air flow is much larger than is the case for the finer dust particles which are substantially unaffected by centrifugal forces in their path. The rotary flow of air around the filter covering of the drum may be generated in a variety of ways. Preferably, it may be provided that the air enters the vortex chamber tangentially. However, in some cases, the air inlet to the vortex chamber may be axial and the air may be rotated, for example, by providing air flow directing surfaces, for example vanes which impart a rotary motion to the incoming air. These air flow vanes may be disposed fixedly. Other means for imparting rotation of the air flow are also possible.

In general, it would be most suitable to aspirate the contaminated air through the filtering system according to the invention, preferably by low pressure systems disposed downstream of the apparatus, for example blowers or fans. It is possible to provide a separate aspirator for each and every air outlet to permit separate removal of the various air flows which carry different contaminants as well as to provide different degrees of vacuum. If several filtering systems according to the invention are used together, they may share vacuum sources or may have separate vacuum sources. It is also possible to aspirate the two separate partial air streams of a single filtering system with a single sub-pressure generator, for example a blower, and to provide the desired different pressures by suitable throttling at the outlets. It is also possible however to blow the air into the apparatus according to the invention at elevated pressure or to combine an in-blowing of the air at elevated pressure with aspiration at reduced pressure.

It is generally most advantageous if the filter casing has a circular cylindrical shape. Preferably, the interior surface wall of the vortex chamber is also in the shape of a circular cylinder, in particular coaxial with the filter casing. However it is also possible to so construct the filtering drum and/or the vortex chamber as to have other configurations, for example frusto-conical or a combination of circular cylindrical and frusto-conical shapes. Another possibility which might be advantageous for manufacture would be a polygonal configuration, preferably an octagonal cross section.

Although it is generally advantageous and sufficient to provide only a single air inlet and a single first and a single second air outlet, it is also conceivable to alter this number of inlets and outlets. In particular, it may be possible, for example, to provide an air inlet at each of the axial ends of the vortex chamber and to place the first air outlet which carries the gross contaminants at roughly mid-altitude of the vortex chamber. It is also possible to provide more than one first and/or second air outlets, for example a second air outlet at each of the opposite ends of the filter casing.

Preferably, the filtering system is so constructed as to normally have a vertical axis of rotation of the filtering drum. It is especially suitable in that case if the air inlet of the vortex chamber is close to or at the top end of the chamber and that the air outlets are located at or near the bottom end of the vortex chamber.

However, in some cases, the rotational axis of the drum may be preferably horizontal.

The invention will be better understood as well as further objects and advantages thereof become more apparent from the ensuing detailed description of a preferred exemplary embodiment taken in conjunction with the drawing.

DETAILED DESCRIPTION OF THE INVENTION

Figure 1:
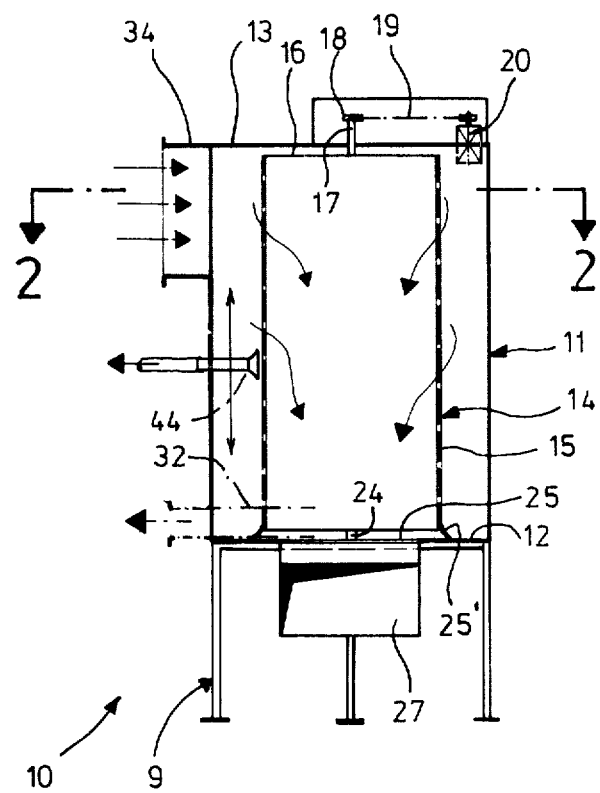
FIG. 1 is a front elevational section of an exemplary embodiment of the filtering system according to the invention.

Turning now to FIG. 1, there will be seen in section a filtering apparatus 10 according to the invention including a table-like support frame 9 having three legs on which is fastened a vortex chamber 11 in the shape of a circular cylinder having flat end faces 12, 13 and a vertical long axis. Disposed within this vortex chamber 11 and coaxially therewith is a filtering drum 14 having a circular cylindrical filter casing 15 which is capable of rotation and whose diameter is substantially smaller than the inside circumference of the vortex chamber 11. The filter casing 15 extends nearly over the entire axial open space of the vortex chamber 11. At the top, the filter casing 15 is closed hermetically by a face plate 16 on which there is mounted a central shaft 17 which can rotate in a suitable fixture disposed in the end wall 13 and sealingly perforates the wall 13, extending thereby from the vortex chamber 11. A second shaft 24 is mounted at the bottom end of the filtering drum at the center of radial spokes 23 which are further supported by a stationary arm 22. The shafts 17 and 24 serve to hold the filtering drum rotatably within the vortex chamber. The shaft 17 carries a pulley 18 on which a roller chain 19 or a suitable belt is carried and is driven by an electric motor 20 which imparts a constant rotational speed to the filter casing 15.

The bottom of the filter casing 15 is left open but its circumference is sealed with respect to the interior space of the vortex chamber 11 by an annular flexible lip seal 25' which touches the bottom 12 of the vortex chamber.

The center of the bottom 12 of the vortex chamber 11 defined within the lip seal 25' includes a large circular air exit aperture 25 which is coaxial with respect to the filter casing 15 and constitutes a second air outlet 25 of the vortex chamber 11. A suitable angular conduit 27 may be connected to the opening 25, permitting the flow of clean air out of the filtering apparatus 10. The cleaned air may be transported for example through an attached line 30 to a sub-pressure generating system 29, or some suction fan from which it is taken to a point of consumption or to the atmosphere.

The vortex chamber 11 is provided with a first air outlet 32 which is disposed at the top of the base 12 and tangential with respect to the circumferential wall of the vortex chamber 11. The cross section of the first air outlet 32 is substantially smaller than the cross section of the second air outlet 25 and of the air inlet 34, because only a relatively small portion of the air flowing through the apparatus is intended to flow out of the first air outlet 32, for example 5 to 15% of the total inflowing air.

Figure 3:
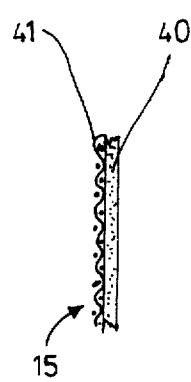
FIG. 3 is a partial sectional illustration of a filter material.

The single air inlet tube 34 terminates tangentially in the vortex chamber 11 so as to impart a pronounced degree of rotation to the contaminated air which enters the chamber. The general motion imparted to the air is helical and proceeds generally obliquely downwardly in the vortex chamber so that the larger contaminants carried by the contaminated air, for example fibers and other objects including the larger grains of dust which would not be passed by the fine grain filter 40 (FIG. 3) of the filter casing 15, are transported to the first air outlet 32 without ever adhering to the filter casing 15 where they are carried out of the apparatus along with the air leaving that air outlet 32 which constitutes a relatively small percentage of the total air flow and in which, accordingly, the concentration of large contaminants is much greater than in the general air flow. The partial air flow passing through the first air outlet 32 may be fed, for example, to a known fiber separator 37, for example one similar to that described in the German Offenlegungsschrift No. 25 42 300, and, because the partial air stream is relatively small, this separator may be of substantially smaller construction than if it had to handle the entire air flow. It is generally most suitable to provide a sub-pressure generator 39 for aspirating the air from the first air outlet 32, for example a suction fan.

Figure 2:
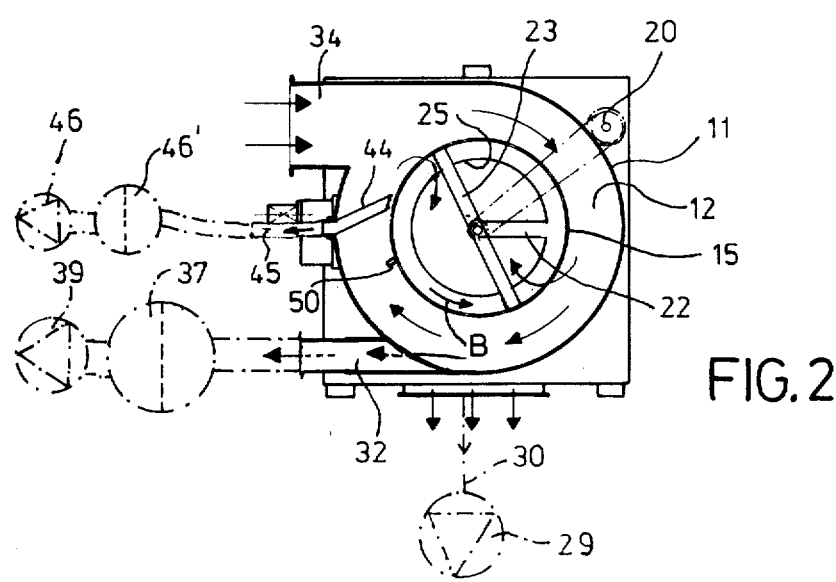
FIG. 2 is a view of the apparatus in FIG. 1 along the section line 2—2.

As may be seen from FIG. 2, the exemplary embodiment described shows the first air outlet tube to be connected to the vortex chamber so as to provide a tangential passage of air from the chamber. In this manner, the fibers and other larger contaminants traveling with the rotating air can pass into the first air outlet 32 in a straight line which is especially advantageous. However, in some cases it may also be provided to dispose the first air outlet 32 in some other manner, for example, radially extending from the vortex chamber or to lie tangential thereto but in the direction opposite to the air flow.

The filter element of the filter casing is formed in this example by two circular cylindrical filter sleeves 40, 41 (FIG. 3) which are superimposed and in contact. The inner filter element 40 is a fine filter for filtering out fine dust and may preferably consist of an open-cell plastic foam material, e.g. open-cell polyurethane. The top layer 41 is intended for filtering out larger contaminants and fibers such as would be expected to reach the first air outlet 32 and this filter may be a grid-like web, known in the art for filtering out fibers and larger contaminants whose purpose in the present apparatus is to prevent the adhesion of such fibers and larger contaminants on the fine filter 40 by preventing their contact with the filter 40. The rotating air prevents the deposition of the fibers and larger contaminants, only some of which ever reach the outer filter 15 anyway, on the filter and transports them into the first air outlet 32. On the other hand, the fine dust carried by the air through the filter element 15 passes on to the fine filter 40 and tends to adhere to its outer surface. This fine dust must then be removed from the outer surface of the filter. This is done by passing a suction nozzle 44 up and down in a straight line parallel to the rotational axis of the filter casing. The suction nozzle 44 is connected through a flexible hose 45 to a known source of suction, for example a blower 46. It may happen that the opening of the suction nozzle 44 which is generally in close proximity of the filter element 15 attracts fibers and the like which can be removed by disposing on the filter casing an elastic pickoff strip 50 which extends radially and which mechanically sweeps off objects adhering to the nozzle at each passage. However, other automatic devices for continuous or intermittent cleaning of the suction nozzle may be provided. Disposed ahead of the suction blower 46 is a relatively small fine dust filter 46' for separating the fine dust which is carried by the air stream through the nozzle whose flow rate is relatively small. As illustrated, it is especially advantageous to dispose the horizontal suction nozzle 44 so as to be directed obliquely with respect to the filter casing 15 and in the opposite direction of its rotation (arrow B) so as to prevent the adhesion of fibers at the circumference of the drum.

The moving seal of the suction nozzle 44 from the vortex chamber 11 may be embodied for example by a ribbon which travels with the nozzle and obturates an elongated opening in the vortex chamber 11 within which the nozzle 15 travels up and down.

The mechanical motion of the nozzle 44 may be performed by means of an endless chain on which is mounted a member that engages a slot of some part of the suction nozzle 44. The suction nozzle 44 may also be provided with a rail or the like for permitting its straight line motion.

The filtering apparatus according to the present invention as illustrated is capable of economical performance even when relatively low flow rates of contaminated air are to be cleaned. For example, it may operate economically for air flow rates of between 1,000 and 100,000 m$^3$/h. However it may also be used for substantially smaller or larger air quantities. It is a further distinct advantage of the apparatus of the invention to use up relatively little space. It is extremely reliable in operation, simple to construct and inexpensive to manufacture. The apparatus operates substantially automatically. When very large quantities of air are to be processed, for example more than 100,000 m³/h. the outer wall of the vortex chamber may actually be formed by a masonry wall. The filter casing may be that of any suitable commercial drum-type filter.

The foregoing relates to a preferred exemplary embodiment of the invention, it being understood that other embodiments and variants thereof are possible without departing from the spirit and scope of the invention.

What is claimed and desired to be secured by Letters Patent of the United States is:

1. An air filter apparatus comprising:
   a housing defining a vortex chamber;
   a rotatable drum disposed in said vortex chamber and provided with a filter casing on its circumference for preventing the passage of fine dust therethrough but permitting the passage of clean air from the outside to the interior of said drum;
   air transport means for generating a pressure drop across said apparatus to thereby cause transport of air through said filtering apparatus;
   at least one air inlet for admitting contaminated air to said vortex chamber, said at least one air inlet terminating in said vortex chamber tangentially thereof for generating a rotary vortex flow of air in said vortex chamber;
   at least one first air outlet from said vortex chamber for removing therefrom air carrying fibers and other contaminants which are large compared with fine dust, said at least one first air outlet leading out of said vortex chamber essentially tangentially therewith, said at least one air inlet being disposed in the vicinity of one of the axial ends of said vortex chamber while said at least one first air outlet is disposed in the vicinity of the opposite axial end of said vortex chamber;
   at least one second air outlet defined by one end of said rotating drum and communicating with the interior of said drum, for carrying from said apparatus clean air which has passed inwardly through said fine filter casing on said drum; and
   movable nozzle means for applying suction to the outside surface of said filter casing to remove therefrom accumulated fine dust particles.

2. An air filtering apparatus according to claim 1, wherein said second air outlet is so dimensioned as to carry at least 85% of the air flowing into the vortex chamber through said air inlet.

3. An air filtering apparatus according to claim 1, wherein said filter casing has a substantially circular cylindrical shape.

4. An air filtering apparatus according to claim 1, wherein the axial extent of said filter casing is substantially equal to the height of said vortex chamber.

5. An air filtering apparatus according to claim 1, wherein the interior wall of said vortex chamber has a substantially circular cylindrical configuration.

6. An air filtering apparatus according to claim 1, wherein said filter casing is disposed coaxially with said vortex chamber.

7. An air filtering apparatus according to claim 1, wherein the axial end of said vortex chamber not defining said second air outlet is hermetically sealed.

8. An air filtering apparatus according to claim 1, wherein said second air outlet is disposed at the same end of the vortex chamber in whose vicinity the first air outlet is also located.

9. An air filtering apparatus according to claim 1, wherein the direction of flow of air through said first air outlet is equal to the tangential flow vector of the vortex flow from said vortex chamber.

10. An air filtering apparatus according to claim 1, wherein the material constituting said filter casing is a fine dust filter consisting of a solid foam.

11. An air filtering apparatus according to claim 1, wherein the filtering material of the filter casing is surrounded by a secondary coarse filter serving to separate fibers and contaminants which are large compared with fine dust.

12. An air filtering apparatus according to claim 11, wherein said secondary coarse filter is a metal grid.

13. An air filtering apparatus according to claim 1, wherein the rotational axis of the rotatable drum is vertical with respect to the earth's surface.

14. An air filtering apparatus according to claim 1, wherein said air transport means applies a pressure drop across said apparatus causing air to be aspirated through said apparatus.

15. An air filtering apparatus according to claim 1, wherein said suction nozzle is disposed obliquely with respect to the surface of said filter casing and in a direction which is opposite to the direction of rotation of said rotatable drum.

16. An air filter apparatus in accordance with claim 1, characterized in that an elastic pickoff strip is disposed on the outside of the circumference of said filter casing which protrudes far enough above said filter casing that at every passage past said suction nozzle means it mechanically cleans the air entryway thereof.

* * * * *